United States Patent [19]

Ludwig

[11] Patent Number: 5,089,052
[45] Date of Patent: Feb. 18, 1992

[54] EMULSIFICATION OF ROCK ASPHALT

[76] Inventor: Allen C. Ludwig, 5914 Brenda La., San Antonio, Tex. 78240

[21] Appl. No.: 392,105

[22] Filed: Aug. 10, 1989

[51] Int. Cl.$^5$ ............................................... C08L 95/00
[52] U.S. Cl. ..................................... 106/276; 106/277; 106/279; 106/280; 404/71
[58] Field of Search ............... 106/276, 277, 279, 280; 404/71

[56] References Cited

U.S. PATENT DOCUMENTS

| | | | |
|---|---|---|---|
| Re. 16,301 | 3/1926 | Bentley | 106/276 |
| 1,472,393 | 10/1923 | Headley | |
| 1,529,829 | 3/1925 | Bentley | 106/276 |
| 1,624,403 | 4/1927 | Frazier | 106/276 |
| 1,725,198 | 8/1929 | Kirschbraun | |
| 1,767,830 | 6/1930 | Alvey et al. | 106/276 |
| 2,026,614 | 1/1936 | Conzelman | 106/276 |
| 2,032,680 | 3/1936 | Wolf | 106/276 |
| 2,160,833 | 6/1939 | Conzelman | 106/276 |
| 3,904,428 | 9/1975 | McConnaughay | 106/278 |
| 3,928,061 | 12/1975 | Hellsten et al. | 106/276 |
| 4,423,088 | 12/1983 | Graf et al. | 106/277 |
| 4,433,084 | 2/1984 | Ostermeyer et al. | 524/62 |
| 4,629,511 | 12/1986 | Vanderzanden | 106/277 |

Primary Examiner—William R. Dixon, Jr.
Assistant Examiner—Helene Klemanski
Attorney, Agent, or Firm—Jones, Day, Reavis & Pogue

[57] ABSTRACT

A method for emulsification of rock asphalt, the resulting low asphalt emulsion and low asphalt emulsion binder for aggregate is disclosed. Fine mesh rock asphalt is emulsified by using a hydrocarbon fluxing agent to sufficiently wet the rock asphalt to produce a fluid mixture, followed by addition of water, small amounts of surfactant and salts, heating the fluid mix while the mixture is being gently stirred. The rock asphalt emulsion can be formed from rock asphalts having low asphalt content, as low as 5, 6, or 7% by weight and greater. Depending on the rock asphalt ore source, the emulsion is comprised of varying amounts of hydrocarbon fluxing oils which are present in sufficient volume to form a fluid mix, from less than about 25% to greater than matching parts by volume of water, and lesser amounts of surfactants and salts. These emulsions have been found to be effective as binders for limestone aggregate coatings, seal, coats, pliable mats and other surprising applications.

22 Claims, No Drawings

EMULSIFICATION OF ROCK ASPHALT

FIELD OF THE INVENTION

The invention relates to a simple method whereby rock asphalt can be emulsified through use of readily available hydrocarbon fluxing agents, water, and the combination of surfactants and common salts. In another aspect, the invention relates to emulsions of rock asphalt or other asphaltic materials which have relatively low asphalt content. In yet another aspect, the invention relates to the utilization of low asphalt content emulsions of rock asphalt ore or related materials for binding limestone aggregate.

The emulsification of rock asphalt, which has traditionally low asphaltic concentrations from less than 6–7% up to about 20%–25% by weight is accomplished through unexpected technical achievement based on the fact that a salt and a surfactant are both required in order to accomplish a lasting emulsion comprised of the rock asphalt, a fluxing agent, and water. The emulsions are relatively pH independent and provide satisfactory application as coatings, seal coats, crack fillers, slurry seals, and binders for concretes. Asphalt concretes are generally a mixture of 4–6% by weight asphalt and 94–96% aggregate, and are normally used for road and highway paving; however, the rock asphalt emulsions herein presented permit concretes through the binding affect of the emulsion on limestone aggregate which further dilutes the asphalt content much below the 4–6% by weight levels.

BACKGROUND OF THE INVENTION

The asphaltic paving, binding and roadway arts have had as an objective for many decades the provision of suitable road building and paving materials with minimum amounts of asphalt presence. A continuing need exists for technology which will provide low asphalt content binders, paving fillers, coatings and the like. In addition, the industry requires new emulsion systems which will allow the production of these materials in combination with suitable mineral aggregate without the high energy input generally required in asphaltic paving. A need exists for stable low asphalt emulsions. Paving binders are frequently in the form of emulsions requiring high loads of solvents and asphalt. These emulsions are heated with considerable mixing, grinding, and milling with suitable aggregate materials for application in building and repairing roads, streets, and parking lots. The requirements for paving repair have also created a need for a paving mixture which can be made at substantially lower temperatures by use of an emulsion of asphalt and aggregate.

Many emulsions of asphaltic materials, including aggregate, sand, and the like have been or are presently being used in the industry, however, these emulsions continue to have limitations, either in their stability or the economic use of asphalt. In order to avoid considerable energy input in the form of heat and milling of asphaltic paving materials, the art has utilized various solvents and soaps in order to produce a mixable emulsion of asphalt and aggregate materials.

On the other hand, asphaltic paving compositions and the like continue to be prepared through the use of heating up to 250° F. and greater with substantial milling in colloidal mills with water solution and gelling agents, wherein the concentration of asphalt is substantially over the 25–50% by weight range. Even with these significant energized forms of asphalt, gels are required in order to enhance the coatability of the aggregate. Bituminous emulsions used as binders in forming paving compositions are well known in the prior art and are in wide commercial use. The maximum limit of the bitumen that can be employed in such emulsions is about 75%. With various gels, this percentage can be raised but substantial energy input is required for the formation of the paving composition from these emulsions which are combined with aggregate material. Common gelling agents are comprised of soaps, either partially or fully saponified. A variety of such gelling agents can be employed in making bituminous gel. For example, a mixture of rosin and fatty acids react with from about 4 to about 25% of a base, e.g., sodium hydroxide, potassium hydroxide, and ammonium hydroxide, or the like. Tall oil and tall oil pitch have been broadly used in the art, which when combined with from about 4–10% of a base such as sodium hydroxide forms a suitable soap filling agent.

More recently, rapid setting emulsions have been provided by mixing asphalt with tall oil, tall oil derivitives or mixtures thereof, and combining and mixing said mixture with treated water, comprising tall oil, tall oil derivatives, and mixtures thereof with strong base, and water. In other methods, rapid setting emulsions are produced by mixing asphalt, copolymers of styrene-butadiene-styrene block and styrene isoprene-styrene block, petroleum distillate, and mixing and combining the asphalt copolymer, petroleum distillate mixture with water, containing tall oil, tall oil derivatives, or mixtures thereof, strong base and water. These rapid setting emulsions are used primarily in surface treatment, such as chip seal coats. Such emulsions are also useful for penetrating treatment of macadam, as sand seal coats, and tack coats to promote adhesion of overlays.

The treatment of pavement surfaces for the rapid setting high-float asphalt emulsion are taught to require a substantial percent by weight of asphalt content, for example, 50–75%, as well as presence of anionic emulsifiers, tall oils, and other organic materials, such as acid esters, which in the presence of a pH greater than about 9 generally created by the presence of sodium hydroxide, potassium hydroxide, and the like, provide gelling agents which are either partially or fully saponified.

Additional work is reported suggesting that pH and electrolyte concentration in an aqueous phase, plays a major role in the stability of water-in-petroleum and residual oil emulsions. It is also suggested that unequal effect on the degree of emulsion collapse is due to pH change in the systems, both before the emulsion is formed and after the emulsion formation.

SUMMARY OF THE INVENTION

The present invention seeks to overcome the foregoing limitations and weaknesses associated with the prior art by providing a method for emulsifying rock asphalt and producing the resulting low asphalt emulsion, as well as utilization of the low asphalt emulsions, as binders for aggregates, fillers, sealing, coatings, and the like. The lower asphalt emulsions, comprised of fluxing agents, water, and lesser amounts of both surfactant and salt, unexpectedly cannot be formed or maintained without the dual presence of the surfactant and salt.

In one aspect, the invention provides a method for forming stable emulsions of fine mesh rock asphalt through the utilization of fluxing agents to wet and form a fluid mix of fine mesh ore to which water is added in amounts of from about 25% to about 150% by volume or greater. This fluid mixture, however, does not present a stable emulsion without the utilization of a mixture of surfactants and salts. The emulsion is being formed by heating from about 175° to about 225° F. with gentle agitation or stirring. In another aspect, the invention is comprised of a rock asphalt emulsion, having low asphalt content, as low as 5, 6, or 7% by weight or greater. These low asphalt emulsions have been found to be effective as binders for limestone aggregate in a one to five parts by volume, thus producing a paving-type material wherein the asphalt content is unexpectedly much lower than the traditionally 4-6% by weight asphalt content found in asphalt concretes.

Depending on the rock asphalt or source, for example, the presence of asphalt may vary from 5, 6, 7% and up to 25% or greater, by weight. The low asphalt emulsions, according to the invention may vary in the amounts of hydrocarbon fluxing oils, e.g., from about 2 to about 10% by weight of the rock asphalt, sufficient presence to form a fluid mix. For purposes of this invention, the fluid mix follows the definition of fluid, i.e., having particles that easily move and change their relative position without a separation of the mass. Further, the fluid mix according to the invention is defined as a mixture of solid and liquids capable of flow. The amount of water may also be varied within the range of from about 25% to greater than 150% by volume. Surfactants are generally present in from about 0.1 to about 5% by weight and the salts are present from about 0.1 to about 10% by weight of the admixture.

For purposes of this invention, surfactants, surface active agents, are comprised of any compounds that affect surface tension and function as wetting agents. Suitable compounds are found in organic derivatives such as sodium salts of high molecular weight, alkyl sulfates or sulfonates and synthetic detergents. Synthetic detergents are surface-active agents and have structurally unsymmetrical molecules containing both hydrophilic, or water-soluble groups i.e., hydrophobic, or oil-soluble hydrocarbon chains.

Anionic detergents form negatively charged ions containing the oil-soluble portion of the molecule. The ionizable group is the hydrophilic portion. Soap is an example of this class and the synthetic members are sodium salts of organic sulfonates or sulfates. Approximately 50% of all synthetic detergents are alkylaryl sulfonates e.g., sulfonates of dodecylbenzene; about 20% of the total are sulfates of straight chain primary alcohols, either fatty alcohols or products of the Oxo process e.g., sodium lauryl sulfate. Still another group are the lignin sulfonate derivatives.

Nonionic detergents do not ionize but acquire hydrophilic character from an oxygenated sidechain, usually polyoxyethlene. The oil-soluble part of the molecule may come from fatty acids, alcohols, amides, or amines. By suitable choice of the starting materials and regulation of the length of the polyoxyethlene chain, the wetting, foaming, and detergent properties of nonionics may be varied greatly. Furthermore, compounds of this type, which comprises about 25% of the total synthetic detergent production, can be used in combination with anionic detergents.

The emulsions and conditions for producing the emulsions are certainly in contrast with typical asphalt emulsion technology, wherein enormous energy must be expended, such as in the use of colloid mills or other high sheer equipment plus heat and emulsions are substantially higher in asphaltic component content.

DESCRIPTION OF THE INVENTION

A practical method has been discovered for emulsifying rock asphalt. In general, rock asphalt material, which will pass through, for example, a ten mesh screen, has been found to be suitable according to the invention. Such material has been generally considered scrap and unusable by the mining industry and cannot be used commercially. Finer mesh material would also be suitable according to the invention, since the aggregate fraction would be smaller, thus being more readily suspendable in the emulsion. The term rock asphalt for purposes of this invention is defined to mean all mineral and mining materials which include asphalt, tars and related hydrocarbon. The method for emulsifying rock asphalt and/or related material such as tar sands, or oil shales, is achieved by wetting the fine mesh ore through use of a hydrocarbon fluxing agent, such as kerosene, diesel fuel oil, gasoline, and the like. The fluxing agent is utilized in sufficient amounts to provide a fluid mix of the fine mesh ore. From about 25% to over 150% volume of water is added to the fluid material and an anoinic or a nonionic surfactant is then added to the fluid mixture as well as common salts, such as sodium chloride and the like, while the fluid mixture is heated from about 170° to about 225° F. under gentle stirring or agitation conditions.

Experimentation produced the unexpected results that without the presence of the salt, the surfactant alone will not emulsify the fluid mixture. The ore simply settles to the bottom of the vessel and the surfactant releases the fluxing agent from the ore. On the other hand, without the surfactant, there will be no emulsion formed.

The use of salt as a necessary component in forming low asphalt emulsions of fine mesh screen rock asphalt is totally unexpected, since it is generally accepted that the use of salt is taught as a method of breaking asphalt emulsions. For example, ASTM Test Method D 244, "Standard Test Methods For Emulsified Asphalts," uses a calcium chloride solution to deemulsify asphalt emulsions. Further, U.S. Pat. No. 3,615,796 and U.S. Pat. No. 4,287,242 describe using salts to precipitate the asphalt from emulsions for quick setting formulations. However, according to the method of the invention, the low asphalt emulsion formed from fine mesh screen rock asphalt ore must have present the surfactant and the salt.

Suitable inorganic salts have been found through experimentation to include potassium chloride, calcium chloride, sodium chloride, ammonium chloride, and the like. It has also been found that sodium hydroxide and potassium hydroxide, both of which are considered to function in a similar manner as salts according to the invention salts are defined by chemical dictionary as "the compound, other than water, which is formed by the reaction of an acid and a base;" have been found suitable for forming the low asphalt emulsions.

Most commercially available anoinic/or a nonionic detergents and other commercially available surfactants are suitable according to the invention for forming the low asphalt emulsions. In addition to a variety of household detergents, commercial surfactants, including sodium and ammonium salts of sulfate esters of an alkylphenoxypoly (ethyleneoxy) ethanol, polyethyleneoxy derivitives, and alkyl phenoxy polyoxyethylene ethanol and the like have been found to produce suitable emulsions according to the invention.

Rock asphalt deposits in Texas which include approximately about 7% by weight asphalt and 93% by weight limestone, as well as rock asphalt deposits from Butan Island in Indonesia, wherein the asphalt content is from 20-30% by weight and the limestone content is from 70-80% by weight, have been successfully emulsified by the present process. The pH environment in these emulsifying conditions according to the invention have been found to vary from 6-10, depending on the salt selected. However, there does not appear to be any major difference in the appearance of the resulting emulsions, even though a vast difference in pH exists. Previous teaching present that higher pH's are necessary in order to form asphaltic emulsions through saponification procedures.

Principle applications of the inventive emulsions are envisioned as coatings, seal coats, crack fillers, slurry seals, binders for concretes, pliable mats, such as a synthetic racing turf and the like. These emulsions provide asphalt in a fluid form with filler, which provides suitable applications beyond those applications utilizing solid material. In addition, the methodology and resulting emulsion compositions according to the invention provide use of fine mesh rock asphalt, which is normally considered as waste and of no commercial value. The emulsification method according to the invention is applicable to other minerals and mining materials, wherein hydrocarbon residue, such as asphalt is present, for example, the tar sands of Canada and oil shales of Colorado and other source locations around the world.

The low-asphalt emulsions of the invention also provide another unexpected performance characteristic in addition to the coatings and crack filler applications which are easily envisioned. The unexpected performance characteristic is in the role of binder applications of those ores containing 20-30% by weight asphalt are also easy to visualize, however, the use of the present invention emulsion wherein an ore of 6-7% by weight asphalt is not generally expected to be considered as a successful binder. Asphalt concretes are generally a mix of 4-6% by weight asphalt and 94-96% by weight aggregates. These concretes are normally used for road pavings, road repairs, and parking lots and the like. Therefore, an ore that is only 6-7% asphalt and 93-94% by weight fine mesh filler, is generally considered to be too near the optimum asphalt content because of the fine mesh aggregates utilized in such concrete and the demand on the available asphalt for wetting the substantial surface area which exists in fine mesh aggregate. However, the emulsified rock asphalt resulting from the present invention has been used in a number of surprising applications. For example, in three experiments, a rock asphalt of 6-7% by weight asphalt was used and prepared according to the methodology of the present invention. In a first experiment, one part of this emulsion was then mixed with five parts by volume of a nominal one-quarter inch limestone aggregate. Complete coating of the limestone aggregate was accomplished with a very thin film of asphalt. Considering that there was a two to one dilution factor in the emulsion (equal volume of water), and a five to one dilution with the aggregate, the total asphalt content of the final material was approximately 0.5% by volume. The aggregate was tightly bound into an integral unit after curing.

In a second experiment, one part emulsion according to the invention was mixed with two parts of quarter-inch limestone aggregate. The coating was obviously thicker on the aggregate than in the previous experiment and the specimen prepared was obviously stronger; however, still having only a total concentration of 1% by volume asphalt. Neither experimental result would be expected to have any integrity since these examples represent only ¼ to 1/6 of the normally required amount of asphalt utilized in asphalt concrete. The performances indicate that the emulsions of rock asphalt, according to the invention, are an efficient means of not only coating aggregates, but also bonding the aggregates into concrete at lower than normal accepted concentrations.

In a third experiment, one part emulsion according to the invention was mixed with five parts of a river bank sand. The object of this experiment was to make a dust free, pliable mat as a synthetic racing turf. All of the sand particles were coated with a thin layer of asphalt, even though the surface area was greater than that in the first experiment. The fact that silica sand was used in place of limestone indicates the emulsions work equally well with silicious or calcareous aggregates. By having such a low asphalt binder, the resultant sand mix will shear under the horses' hooves, making for a more resilient pad. This is but one example of potentially unique applications for such a material.

While the focus invention methodology is based upon emulsification of rock asphalt and the resulting emulsions, utilizing fluxing agents, water, surfactant, and salt; other aggregate matrix and materials are reasonably expected to perform in a similar fashion. In the case of rock asphalt, the matrix is limestone aggregate, however, it is reasonable to assume the methodology of the present invention would be suitable for forming low asphalt emulsions when the matrix is sand, sandstone, shale, clay, and the like.

Depending on the nature of the rock asphalt ore and to some degree the mesh screen size of the ore, the inventive ingredient concentrations necessary for forming the low asphalt emulsion will vary. However, for rock asphalt ore which will pass through, for example, ten mesh screen, having an asphalt content of from about 6-7% by weight, can be successfully formed into a fluid mixture by the present invention using sufficient fluxing oil to wet the ore and activate the asphalt. The fluid mixture can then be emulsified by addition of from about 25% to 150% volume of water to the rock asphalt fluid mixture, as well as addition to the total mix of from 0.1 to about 5% by weight surfactant and from 0.1 to about 10% by weight salt. The resulting mixture being heated to about 170° F. to about 220° F. under general stirring or similar agitation conditions. Emulsion is easily formed under these conditions, which is in contrast with typical asphalt emulsion technology, where enormous energy input is expended, in combination with high asphalt loading.

The preparation of the following rock asphalt emulsions in accordance with the invention are provided as examples only and are not intended to restrict either the method or components of the inventive low asphalt emulsions.

EXAMPLE 1

Fifty grams of rock asphalt were combined with two grams of kerosene in order to completely wet the rock asphalt and to flux the asphalt. Thirty grams of water was added to the fluid mixture. To this mixture, 0.1 grams of Ivory dish detergent and 0.5 grams of table salt (sodium chloride) were added. The mixture was heated to boiling with gentle stirring and the material emulsified within 2-3 minutes.

EXAMPLE 2

One gram of a fluxing oil and 0.5 grams of an aromatic fluxing oil commonly used in commercial mining were added to flux the asphalt in fifty grams of rock asphalt ore. Thirty grams of water were added and to this mixture, 0.2 grams of Palmolive dish detergent and 1 gram of sodium chloride were added. The mixture was heated to 180° and within two to three minutes the material emulsified with gentle stirring.

EXAMPLE 3

Five grams of kerosene were added as the fluxing oil and dilutant to fifty grams of rock asphalt. Thirty grams of water and 0.1 grams of ammonium salt of a sulfate ester of an alkylphenoxypoly (ethyleneoxy) ethanol and 1 gram of calcium chloride were added to the fluid mix of the rock asphalt and kerosene. The admixture was heated to boiling and the emulsion formed with gentle agitation in 2-3 minutes.

What have been described are various aspects of certain adaptations of the emulsification of rock asphalt and the resulting emulsions according to the invention which constitute presently preferred embodiments. It is understood that the foregoing description examples present in a way of explanation the invention and are not to be taken as limitations on the scope of the invention, which is defined solely by the appended claims and their equivalents. Various changes and modifications to the preferred embodiments will be apparent to those skilled in the art. Such changes and modifications can be made without departing from the scope and spirit of the invention. Accordingly, it is intended that all such changes and modifications be covered by the appended claims and their equivalents.

What is claimed is:

1. A method for emulsification of rock asphalt ore containing at least 4% by weight asphalt comprising;
    wetting a fine mesh rock asphalt ore with a hydrocarbon fluxing agent in sufficient volume to produce a fluid mix;
    adding from about 25 to about 150% by volume water to the fluid mix;
    adding from 0.1 to about 5.0% by weight based on the fluid mix of a surfactant;
    adding from 0.1 to about 10% by weight of an inorganic asphalt and comprising salt; and
    heating the admixture from about 170° F. to about 225° F. with agitation.

2. The method of emulsification of rock asphalt ore according to claim 1 wherein the surfactant is selected from the group consisting of anionic and nonionic compounds.

3. The method for emulsification of rock asphalt according to claim 2 wherein the surfactant is comprised of synthetic detergents.

4. The method for emulsification of rock asphalt ore according to claim 1 wherein the inorganic salt is selected from the group consisting of potassium chloride, calcium chloride, sodium chloride, and ammonium chloride.

5. The method for emulsification of rock asphalt ore according to claim 1 wherein the admixture of rock asphalt, fluxing agent, water, surfactant, and inorganic salt is heated to boiling.

6. The method for emulsification of of rock asphalt ore according to claim 1 wherein water is added to the fluid mix, comprising of from 33% to about 100% by volume of water to fluid mix.

7. The method for emulsification or rock asphalt according to claim 1 wherein the rock asphalt ore is comprised of from at least about 6% by weight asphalt.

8. The method for emulsification of rock asphalt ore according to claim 7 wherein the fine mesh rock asphalt will pass through a ten mesh screen.

9. The method for emulsification of rock asphalt ore according to claim 1 wherein the hydrocarbon fluxing agent is selected from the group consisting of kerosene, diesel, and gasoline.

10. A method for emulsification of rock asphalt ore comprising:
    wetting a ten mesh rock asphalt ore with a hydrocarbon fluxing agent in an amount of, from 2 to about 10% by weight based on the hydrocarbon fluxing agent of the rock asphalt ore to produce a fluid mix.
    adding from about 25 to about 150% by volume of water to fluid mix;
    admixing from 0.1 to about 5% by weight of an anionic or nonionic surfactant;
    admixing from 0.1 to about 10% by weight of sodium chloride; and
    heating the admixture to boiling temperature with gentle stirring.

11. A method for forming pliable mat synthetic surfaces comprising admixing one part by volume of a rock asphalt ore emulsion comprised of from about 4% to about 7% by weight asphalt and from about 93% to about 96% by weight aggregate, from 2% to 10% by weight hydrocarbon fluxing agent; 25% to 150% by volume water, 0.1% to about 5% by weight surfactant and 0.1% to about 10% by weight of an inorganic halide salt; with from about 2 to about 5 parts of river sand to form an emulsion and coating said emulsion onto a surface to form said pliable mat synthetic surface.

12. A pliable mat synthetic surface produced according to the method of claim 11.

13. A pliable mat synthetic surface according to claim 12 which is suitable for racing track surfaces for animal racing.

14. A pliable mat synthetic surface according to claim 13 which is suitable as a racing track surface for the group of animals consisting of horses, dogs and humans.

15. An emulsion of rock asphalt ore containing at least about 6% by weight of asphalt, from 2% to 10% by weight based on the rock asphalt of a hydrocarbon fluxing agent, 25% to 150% by volume water based on the resulting mixture, 0.1% to about 5% by weight of an anionic or non-ionic surfactant, and from 0.1% to about 10% by weight of halide salt.

16. The emulsion according to claim 15 wherein the surfactant is comprised of synthetic detergents.

17. The emulsion according to claim 15 wherein the slats are selected from the group consisting of sodium chloride, potassium chloride, calcium chloride, and ammonium chloride.

18. The emulsion according to claim 15 wherein water is present in a 33% to about 100% by volume relationship to the fluid mixture.

19. The emulsion according to claim 15 wherein the rock asphalt is comprised of ten mesh material.

20. The emulsion according to claim 15 wherein the hydrocarbon fluxing agent is selected from the group consisting of kerosene, diesel, and gasoline.

21. A method for forming asphalt concretes of from 1% to about 4% by weight asphalt and from 96% to about 99% by weight aggregate comprising:
(a) forming an emulsion of rock asphalt by;
wetting a fine mesh rock asphalt ore with a hydrocarbon fluxing agent in sufficient volume to produce a fluid mix,
adding from about 25% to about 150% by volume water to the fluid mix,
adding from 0.1% to about 5.0% by weight of a surfactant based on the fluid mix, and
heating the admixture from about 170° F. to about 225° F. with agitation;
(b) mixing the emulsion of rock asphalt with 2 to 5 volumes of a nominal ¼" limestone aggregate;
(c) curing the resulting emulsion coated limestone aggregate; and
(d) forming a tightly bound asphalt concrete.

22. A method for emulsification of rock asphalt ore containing at least 4% by weight asphalt comprising:
wetting a fine mesh rock asphalt ore with a hydrocarbon fluxing agent in sufficient volume to produce a fluid mix;
adding from about 25% to about 150% by volume water to the fluid mix;
adding from 0.1% to about 5.0% by weight based on the fluid mix of a surfactant;
adding from 0.1% to about 10% by weight based on the fluid mix of a hydroxide selected from the group consisting of sodium hydroxide and potassium hydroxide; and
heating the mixture from about 170° F. to about 225° F. with agitation.

* * * * *